United States Patent
Ito et al.

(10) Patent No.: US 11,390,242 B2
(45) Date of Patent: Jul. 19, 2022

(54) MULTILAYER FILM FOR USE IN AIR BAG AND AIR BAG

(71) Applicant: ASAHI KASEI KABUSHIKI KAISHA, Tokyo (JP)

(72) Inventors: Miyuki Ito, Tokyo (JP); Tadayoshi Matsumura, Tokyo (JP); Yusuke Sato, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/263,892

(22) PCT Filed: Aug. 6, 2019

(86) PCT No.: PCT/JP2019/030926
§ 371 (c)(1),
(2) Date: Jan. 28, 2021

(87) PCT Pub. No.: WO2020/032032
PCT Pub. Date: Feb. 13, 2020

(65) Prior Publication Data
US 2021/0316692 A1    Oct. 14, 2021

(30) Foreign Application Priority Data
Aug. 8, 2018   (JP) .............................. JP2018-149588

(51) Int. Cl.
*B60R 21/235*    (2006.01)
*B32B 5/02*    (2006.01)
(Continued)

(52) U.S. Cl.
CPC ............ *B60R 21/235* (2013.01); *B32B 5/024* (2013.01); *B32B 7/12* (2013.01); *B32B 27/08* (2013.01);
(Continued)

(58) Field of Classification Search
CPC ......... B32B 27/08; B32B 27/12; B32B 27/34; B32B 27/32; B32B 5/022; B32B 5/024;
(Continued)

(56) References Cited

U.S. PATENT DOCUMENTS

| | | | |
|---|---|---|---|
| 4,965,757 | A | 10/1990 | Grassart |
| 2007/0065614 | A1 | 3/2007 | Schulthess |

(Continued)

FOREIGN PATENT DOCUMENTS

| | | |
|---|---|---|
| EP | 1518761 A1 | 3/2005 |
| JP | 2006083263 A | 3/2006 |

(Continued)

OTHER PUBLICATIONS

Feb. 9, 2021, International Preliminary Report on Patentability issued in the International Patent Application No. PCT/JP2019/030926.

(Continued)

*Primary Examiner* — Yan Lan
(74) *Attorney, Agent, or Firm* — Kenja IP Law PC

(57) ABSTRACT

The present disclosure is directed to provide a multilayer film for use in an air bag, which provides sufficient adhesiveness and blocking tendency in a well-balanced manner. The multilayer film for use in an air bag according to the present disclosure includes an adhesive layer and an outer layer. The adhesive layer includes a resin having a glass transition temperature from 0° C. to 80° C. and a melting point from 100° C. to 160° C. The outer layer includes a resin having a melting point higher than the melting point of the resin included in the adhesive layer by 20° C. or higher. Further, an air bag according to the present disclosure includes a synthetic fiber fabric and the aforementioned (Continued)

multilayer film for use in an air bag, in which the adhesive layer in multilayer film is laminated with the synthetic fiber fabric.

10 Claims, 4 Drawing Sheets

(51) Int. Cl.
*B32B 27/32* (2006.01)
*B32B 27/34* (2006.01)
*B32B 7/12* (2006.01)
*B32B 27/08* (2006.01)
*B32B 27/12* (2006.01)

(52) U.S. Cl.
CPC .............. *B32B 27/12* (2013.01); *B32B 27/32* (2013.01); *B32B 27/34* (2013.01); *B32B 2262/0261* (2013.01); *B32B 2262/0276* (2013.01); *B32B 2270/00* (2013.01); *B32B 2605/08* (2013.01); *B60R 2021/23514* (2013.01)

(58) Field of Classification Search
CPC ... B32B 5/026; B32B 7/12; B32B 2262/0261; B32B 2262/0276; B32B 2270/00; B32B 2605/08; B32B 2021/23514; B60R 21/235; B60R 2021/23514; Y10T 428/1352; Y10T 428/1359; Y10T 428/1362; Y10T 428/1379; Y10T 428/31725; Y10T 428/31779; Y10T 442/2139; C09J 2203/354; C09J 2301/122; C09J 2301/162; C09J 2301/312; C09J 2423/006; C09J 2477/00; C09J 2477/006; C09J 7/25; C09J 7/29; C09J 7/35

See application file for complete search history.

(56) References Cited

U.S. PATENT DOCUMENTS

| | | | |
|---|---|---|---|
| 2008/0075903 | A1 | 3/2008 | Keshavaraj et al. |
| 2013/0090407 | A1 | 4/2013 | Carter et al. |
| 2015/0167207 | A1 | 6/2015 | Bongartz et al. |
| 2016/0194790 | A1* | 7/2016 | Ise .......................... D03D 1/02 139/420 A |

FOREIGN PATENT DOCUMENTS

| | | |
|---|---|---|
| JP | 2013530294 A | 7/2013 |
| JP | 2014533321 A | 12/2014 |
| JP | 2015052037 A | 3/2015 |
| JP | 2015509560 A | 3/2015 |
| JP | 2017036530 A | 2/2017 |
| KR | 1020140070444 A | 6/2014 |
| KR | 1020170052048 A | 5/2017 |
| KR | 1020170094951 A | 8/2017 |
| WO | 9926783 A1 | 6/1999 |
| WO | 2013071230 A1 | 5/2013 |

OTHER PUBLICATIONS

Aug. 9, 2021, the Supplementary European Search Report issued by the European Patent Office in the corresponding European Patent Application No. 19846093.3.

Sep. 17, 2019, International Search Report issued in the International Patent Application No. PCT/JP2019/030926.

* cited by examiner

MULTILAYER FILM FOR USE IN AIR BAG AND AIR BAG

TECHNICAL FIELD

The present disclosure relates to a multilayer film for use in an air bag and an air bag.

More particularly, the present disclosure relates to a multilayer film for use in an air bag, including an adhesive layer to be adhered to a surface of a synthetic fiber fabric by heat or the like, and an outer layer, and to an air bag including a synthetic fiber fabric laminated with the multilayer film for use in an air bag through thermal lamination.

BACKGROUND

Air bags are typically used in vehicles. In vehicle applications, in the event of a collision, an air bag in the folded state is immediately inflated by an inflator for absorbing the kinetic energy of the collision to thereby prevent or reduce any damage to an occupant. In recent years, various vehicle-related safety regulations and increasing awareness to the safety have increased the number of vehicles equipped with air bags.

There are various types of vehicle air bags, including front air bags intended to provide protection against frontal collisions, side air bags and side curtain air bags intended to provide protection against side collisions and rollovers of vehicles, as well as outside air bags intended to protect pedestrians. The characteristics required for these air bags include the flexibility enabling the air bags to be compactly housed within limited space, strength characteristics capable of resist against the pressure during being inflated, and the air-tightness for remaining the inflated state for certain time. Particularly, side curtain air bags need to remain inflated for longer time than front air bags, for protecting the occupant from a side collision and an possible rollover of the vehicle caused by the collision. A higher air-tightness is therefore required.

An air bag is made of materials, including a synthetic fiber fabric (hereinafter, also referred to "base fabric") as a support layer, and a barrier material covering the surface of the base fabric to impart air-tightness. As the barrier material, silicone rubber (which is applied through coating) or a multilayer film (which is applied through thermal lamination) is used depending on the required characteristics.

As barrier materials, JP 4965757 B (PTL 1) discloses a technique regarding a multilayer film composed of a high-melting-point resin layer and a low-melting-point resin layer. PTL 1 discloses usage of a modified polyolefin having a melting point from 85° C. to 105° C. for the low-melting-point resin layer to be adhered to a base fabric. Further, EP 1518761 B (PTL 2) discloses a technique regarding a multilayer film including resin layers having different glass transition temperatures. PTL 2 discloses usage of a copolyamide, a copolyester, or a polyamide elastomer having a glass transition temperature of −10° C. or lower for a first resin layer to be adhered to a base fabric.

CITATION LIST

Patent Literature

PTL 1: JP 4965757 B
PTL 2: EP 1518761 B

SUMMARY

Technical Problem

In the disclosure of PTL 1, however, the modified polyolefin which is used for the adhesive layer to be adhered to a base fabric has a low affinity with base fabrics made of polyamide fibers or polyester fibers. The adhesion strength therefore becomes insufficient. Thus, when an air bag with an insufficient adhesion strength is inflated, a multilayer film might be detached from the base fabric and the air bag might not fully exhibit its intended function.

In contrast, the barrier material of PTL 2 is excellent in flexibility and adhesiveness because one of a copolyamide, a polyamide elastomer, and a polyester elastomer having a glass transition temperature of −10° C. or lower is used for the adhesive layer. It, however, has a drawback in that the stereoregularity of the molecular structure of the adhesive layer is low, resulting in reduced degree of crystallization. As a result, blocking (fusion) tends to occur. For example, in cases where a barrier material is produced using the inflation method which is excellent in productivity (FIG. 1), blocking occurs between pinch rolls after blow-up. This makes it difficult to separate two films which have been overlapped, in the subsequent peeling step. Film tearing or deviation of peeling position may cause wrinkles in films and winding deviation, which makes stable production of films difficult. In addition, storage of a wound film product which readily blocks may be problematic. Specifically, blocking of the film may occur depending on the storage conditions such as the temperature and the humidity, or the winding tension, and pulling out the film may become difficult.

It thus would be helpful to provide a multilayer film for use in an air bag, which provides sufficient adhesiveness and blocking resistance in a well-balanced manner.

Solution to Problem

The present disclosure has been made in light of the above background. We have found out through our extensive studies that the blocking resistance and the adhesiveness can be more excellently balanced by forming an adhesive layer using a resin having a glass transition temperature and a melting point within certain ranges, and forming an outer layer using a resin having a melting point higher than that of the resin included in the adhesive layer by 20° C. or higher, thereby completing the present disclosure.

Specifically, the present disclosure provides the following:

(1) A multilayer film for use in an air bag, the multilayer film comprising:
an adhesive layer; and
an outer layer,
the adhesive layer comprising a resin having a glass transition temperature from 0° C. to 80° C. and a melting point from 100° C. to 160° C., and
the outer layer comprising a resin having a melting point higher than the melting point of the resin comprised in the adhesive layer by 20° C. or higher.

(2) The multilayer film for use in an air bag according to (1), wherein the resin comprised in the adhesive layer is a polyamide-based resin.

(3) The multilayer film for use in an air bag according to (2), wherein the polyamide-based resin is a copolyamide.

(4) The multilayer film for use in an air bag according to (3), wherein the copolyamide is a copolymer of polyamide 12 and polyamide 6.

(5) The multilayer film for use in an air bag according to (3) or (4), wherein the adhesive layer comprises the copolyamide in an amount of 10 mass % or more relative to 100 mass % of the adhesive layer.

(6) The multilayer film for use in an air bag according to any one of (1) to (5), wherein the adhesive layer further comprises an anti-blocking agent and/or a nucleating agent.

(7) A multilayer film for use in an air bag according to any one of (1) to (6), further comprising a middle layer between the adhesive layer and the outer layer, the middle layer comprising a polyolefin-based resin.

(8) An air bag comprising:
a synthetic fiber fabric; and;
a multilayer film for use in an air bag according to any one of (1) to (7), the adhesive layer in the multilayer film being laminated with the synthetic fiber fabric.

(9) The air bag according to claim 8, wherein the synthetic fiber fabric comprises polyamide fibers or polyester fibers.

Advantageous Effect

The multilayer film for use in an air bag according to the present disclosure has an excellent storability achieved by reduced blocking tendency, and has an excellent adhesiveness to a synthetic fiber fabric. An air bag with stable qualities and a high reliability can therefore be produced.

BRIEF DESCRIPTION OF THE DRAWINGS

In the accompanying drawings.

DETAILED DESCRIPTION

Figure 1:
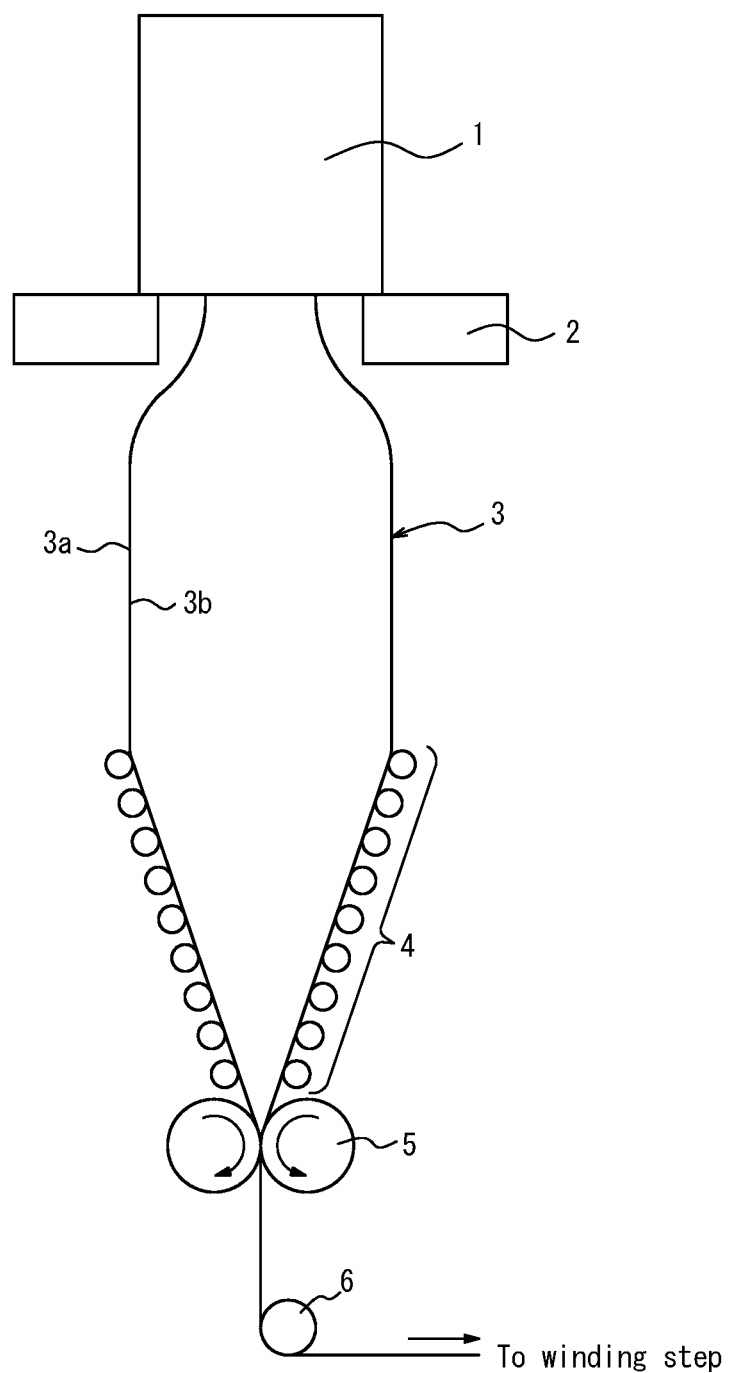
FIG. 1 illustrates a schematic representation of one example of an inflation method.

Hereinafter, details of an embodiment for carrying out the present disclosure will be described. The present disclosure, however, is not limited to the embodiment, illustrations, and the like described below, and may be arbitrarily modified without departing from the spirit and equivalent scopes of the present disclosure.

A multilayer film for use in an air bag according to the present embodiment is composed of at least two layers. Of these layers, a layer to be adhered to a base fabric of an air bag is referred to as the "adhesive layer", and a layer to be exposed outside and define the exterior of the air bag is referred to as the "outer layer".

The multilayer film for use in an air bag according to the present embodiment has an excellent storability achieved by reduced blocking tendency, and has an excellent adhesiveness to a fiber fabric. An air bag with stable qualities and a high reliability can therefore be produced.

The multilayer film according to the present embodiment will be described below.

The multilayer film according to the present embodiment may have a 2-layer structure composed of the adhesive layer/outer layer in which the adhesive layer and the outer layer are laminated together. Alternatively, the multilayer film may have a 3-layer structure composed of the adhesive layer/middle layer/outer layer, or a 5-layer structure composed of the adhesive layer/glue layer/middle layer/glue layer/outer layer. Further, layers other than the above-mentioned layers may be further included. The adhesive layer and the outer layer are preferably surface layers on the both surfaces of the multilayer film according to the present embodiment.

(Adhesive Layer)

It has been known that the blocking tendency of a crystalline resin is dominated by the crystallinity (the degree of crystallization and the crystallization speed). We have found out through our studies that the blocking tendency can also be reduced by controlling the glass transition temperature of the crystalline resin. Further, we have also found out that a multilayer film for use in an air bag having further well-balanced blocking resistance and adhesiveness can be produced by using a resin having a glass transition temperature and a melting point within certain ranges for an adhesive layer, thereby completing the present disclosure.

The adhesive layer preferably contains a resin having a glass transition temperature from 0° C. to 80° C. and a melting point from 100° C. to 160° C. (hereinafter, this resin is sometimes referred to as the "resin A"). In addition to the resin A, the adhesive layer may also include another resin (hereinafter, this resin is sometimes referred to as the "resin B"). The resin A and/or the resin B may be one resin or two or more resins.

The adhesive layer may be made only from the resin A, or may further contain the resin B and/or an additive to be described later.

The glass transition temperature of the resin A is preferably from 0° C. to 80° C., more preferably from 10° C. to 70° C., and even more preferably from 20° C. to 60° C. The range of the glass transition temperature is determined in view of the blocking resistance and the melting point. When the glass transition temperature is 0° C. or higher, the blocking resistance is further reduced. When the glass transition temperature is 80° C. or lower, the melting point to be described later can be controlled so as to fall within an appropriate range.

The glass transition temperature can be measured by using the method described in Examples below.

In cases where the resin A is composed of a plurality of resins, the glass transition temperature of each resin in the resin A may be the same or different.

The melting point of the resin A is preferably from 100° C. to 160° C., more preferably 110° C. to 150° C., and even more preferably from 120° C. to 140° C. When the melting point is 100° C. or higher, the adhesion strength with a base fabric can be retained even under a usage environment at high temperatures and the ranges of conditions for lamination processing such as the temperature, the pressure, time, etc. (also referred to as the process window) are extended. This enables fabrication of a multilayer film with stable qualities. On the other hand, when the melting point is 160° C. or lower, an appropriate flexibility can be provided.

The melting point can be measured by using the method described in Examples below.

In cases where the resin A is composed of a plurality of resins, the melting point of each resin in the resin A may be the same or different. In addition, in cases where the resin A is composed of a plurality of resins and has a plurality of melting peaks, the melting peak of the resin A on the high-temperature side is preferably from 100° C. to 160° C., more preferably from 110° C. to 150° C., and even more preferably from 120° C. to 140° C.

The resin A may include a single component, may be a mixture of a plurality of components blended together, or may be a mixture further including an additional polar component blended together.

The resin A is preferably a polyamide-based resin. This is because polyamide-based resins exhibit only small changes in characteristics, such as the flexibility and the adhesiveness, when the temperature and the humidity in a usage environment vary. Among polyamide-based resins, a copolyamide (a-1), a dimer acid-based polyamide (a-2), and a thermoplastic polyamide elastomer (a-3) are preferred, and the copolyamide (a-1) is more preferred in view of the flexibility, the adhesiveness, and the cost.

The copolyamide (a-1) is a copolyamide synthesized through copolymerization of two or more of monomer components known as monomer components composing aliphatic polyamides (such as monomer components composing polyamide 6, polyamide 66, polyamide 610, polyamide 11, and polyamide 12), for example. Examples of such a copolyamide include polyamide 6/66, polyamide 6/12, polyamide 6/11, and polyamide 6/66/11.

Examples of the dimer acid-based polyamide (a-2) include dimer acid-based polyamides made from a raw material synthesized through dimerization of a fatty acid of a natural vegetable oil (an unsaturated fatty acid having 18 carbon atoms, e.g., oleic acid and linoleic acid).

Examples of the thermoplastic polyamide elastomer (a-3) include thermoplastic polyamide elastomers (including dimeric acid-based thermoplastic polyamide elastomers) containing polyether as a soft segment (amorphous phase) and a polyamide component as a hard segment (crystalline phase).

Among these, polyamide 6/12 is preferred from the viewpoint of its particularly excellent flexibility and adhesiveness.

The adhesive layer may be a mixed resin layer containing the resin B as described above, in addition to the resin A. In this case, preferred examples of the resin B include an acid-modified polyolefin, an ionomer, and a thermoplastic polyamide elastomer. In view of the flexibility and the adhesiveness in a low temperature environment, preferably, the glass transition temperature is less than 0° C. and the melting point is in the range from 80° C. to 160° C.

Further, in view of the adhesiveness, the mass ratio of the resin B in the adhesive layer is preferably 90 mass % or less, more preferably 80 mass % or less, and even more preferably 70 mass % or less, relative to the mass of the adhesive layer (taken as 100 mass %).

The adhesive layer may contain an additive as appropriate, such as an anti-blocking agent, a lubricant, a nucleating agent, a flame retardant, an antistatic agent, an antioxidant, an ultraviolet absorber, a light stabilizer, a colorant, and a filler, within a range not negatively affecting practical characteristics such as the adhesiveness. Among these, from the viewpoint of further improving the blocking resistance of the adhesive layer, the adhesive layer includes preferably an anti-blocking agent, a nucleating agent, and/or a lubricant, more preferably an anti-blocking agent and/or a nucleating agent, and even more preferably an anti-blocking agent and a nucleating agent.

Examples of the anti-blocking agent include organic particles such as particles of a crosslinked polystyrene or a crosslinked acrylic (PMMA) resin, or fluorine-based resin (PTFE) particles; and inorganic particles such as silica-based particles, and particles of kaolin or calcium carbonate.

Examples of the nucleating agent include talc, alumina, kaolin, and a high-melting-point polyamide (e.g., a polyamide having a melting point of greater than 160° C.) and the like.

Examples of the lubricant include aliphatic amides and metal soaps.

The mass ratio of the resin A in the adhesive layer is preferably 10 mass % or more, more preferably 20 mass % or more, and even more preferably 30 mass % or more, relative to the mass of the adhesive layer (taken as 100 mass %), from the viewpoint of further improving the adhesiveness and the blocking resistance.

The mass ratio of the additive in the adhesive layer is preferably 30 mass % or less, more preferably 20 mass % or less, and even more preferably 10 mass % or less, relative to the mass of the adhesive layer (taken as 100 mass %), in view of the adhesiveness and the blocking resistance.

The mass ratio of the resin A (e.g., copolyamide) is preferably 10 mass % or more, more preferably from 20 mass % to 100 mass %, and even more preferably from 30 mass % to 100 mass %, relative to 100 mass % of the adhesive layer, in view of the adhesiveness and the blocking resistance.

(Outer Layer)

The outer layer preferably contains a resin.

The resin used for the outer layer is preferably a resin having a melting point high than the melting point of the resin A. Further, the resin used for the outer layer is preferably a resin having a melting point high than the melting point of the adhesive layer.

The melting point of the resin used for the outer layer is higher than the melting point of the resin A by preferably 20° C. or higher, more preferably 25° C. or higher, and even more preferably 30° C. or higher. The melting point of the resin used for the outer layer is selected based on the ease of adhesion (sticking) to a heating roll used in a lamination step to laminate the multilayer film to a base fabric. When a resin having a melting point higher than the melting point of the resin A by 20° C. or higher is used for the outer layer, the multilayer film hardly sticks to the heat roll, which enables a stable lamination.

In cases where a plurality of resins composing the resin A are contained in the adhesive layer and/or where a plurality of resins are contained in the outer layer, the melting point of the mixed resin may be defined as the melting peak having the highest temperature among melting peaks attributed to the mixed resin contained in the layer.

The resin used for the outer layer is preferably a polyamide-based resin or a polyester-based resin, from the viewpoint of providing an outer layer excellent in characteristics such as the air-tightness, the abrasion resistance, the flexibility, the strength, the dead foldability (the dead foldability refers to resistance to a stress imparted when being folded), the flame retardancy, and the slipperiness.

Examples of the polyamide-based resin include the polyamide-based resins (a-1, a-2, and a-3) exemplified for the resin A contained in the adhesive layer, and a composition containing one or a blend of a plurality of these polyamide-based resins can be suitably used.

The polyester-based resin is preferably a thermoplastic polyester elastomer, and examples include thermoplastic polyester elastomers containing a polyether component as a soft segment (polyether-polyester type) and thermoplastic polyester elastomers containing a polyester component as a soft segment (polyester-polyester type).

(Middle Layer)

The middle layer is, for example, a layer made of a composition containing one or a blend of polyolefin-based resins such as linear low-density polyethylene, low-density polyethylene, medium-density polyethylene, high-density polyethylene, and polypropylene; acid-modified polyolefin-based resins; polyolefin copolymer resins; polyolefin-based thermoplastic elastomers; and acid-modified polyolefin-based elastomers. The middle layer preferably includes a polyolefin copolymer resin or/and a polyolefin-based thermoplastic elastomer in view of the flexibility.

(Glue Layer)

A glue layer is a layer which serves to bond layers to each other. Examples of the glue layer include a layer made of an acid-modified polyolefin-based resin having a polar functional group, such as acid-modified polyethylene and acid-modified polypropylene, or/and a polyolefin-based thermoplastic elastomer. It is desirable to select the glue layer in consideration of the demand for heat resistance or other properties in the usage application.

The glue layer may be made only from one resin, or contains a plurality of resins.

(Multilayer Film)

The multilayer film according to the present embodiment is a film composed of at least two or more layers. The film has a total thickness of preferably from 5 μm to 100 μm, more preferably from 10 μm to 80 μm, and even more preferably from 15 μm to 50 μm. The range of the total thickness of the multilayer film is selected so that the strength and the flexibility are well balanced. A thickness of 5 μm or more provides a good strength, while a thickness is 100 μm or less provides a good flexibility.

In the multilayer film according to the present embodiment, the ratio of the thickness of the outer layer relative to the thickness of the adhesive layer (taken as 100%) is preferably from 20% to 500% and more preferably from 50% to 400%, from the viewpoint of a good balance between the flexibility and the abrasion resistance.

In addition, when the multilayer film according to the present embodiment has a 5-layer structure composed of the outer layer/glue layer/middle layer/glue layer/adhesive layer, the thickness ratios of the glue layer, the middle layer, and the outer layer are preferably from 10% to 500%, from 50% to 10000%, and from 10% to 5000%, respectively, relative to the thickness of the adhesive layer (taken as 100%).

Examples of the method of manufacturing the multilayer film include the method in which molten resins are coextruded from a multilayer circular die to form a multilayer film including the respective layers by the inflation method, and the T-die method in which molten resins are coextruded from a T-die and the resultant film is cooled and solidified on a cast roll. Among these, the inflation molding is excellent in productivity and can thus be preferably used.

When the inflation method is used, the die temperature is from 170° C. to 280° C., for example. A lip of the circular die has an outer size from 50 mm to 500 mm and a lip clearance from 0.5 mm to 10 mm, for example. The blow-up ratio is 1 to 10 times, the air ring temperature is from 30° C. to 50° C., the distance between the circular die and pinch rolls is from 1 m to 100 m, and the take-up speed is from 1 m/min to 200 m/min, for example.

(Air Bag)

An air bag according to the present embodiment includes the multilayer film as described above. Further, the air bag preferably includes a synthetic fiber fabric (base fabric).

Examples of synthetic fibers composing the synthetic fiber fabric include polyamide fibers, polyester fibers, polyolefin-based fibers, chlorine-containing fibers, fluorine-containing fibers, polyacetal-based fibers, polysulfone-based fibers, polyphenylene sulfide (PPS)-based fibers, polyether ether ketone (PEEK)-based fibers, wholly aromatic polyeamide-based fibers, wholly aromatic polyester-based fibers, polyimide-based fibers, polyetherimide-based fibers, polyparaphenylene benzobisoxazole (PBO)-based fibers, vinylon-based fibers, acrylic fibers, cellulose-based fibers, silicon carbide-based fibers, alumina-based fibers, glass-based fibers, carbon-based fibers, and steel-based fibers. Among these, polyamide fibers or polyester fibers are preferred in view of their properties, such as the strength, the specific gravity, the cost, and the adhesion strength with a multilayer film.

The air bag preferably includes the synthetic fiber fabric and the multilayer film, wherein the adhesive layer in the multilayer film is laminated to the synthetic fiber fabric.

Examples of the method of manufacturing the air bag include the thermal lamination method involving a continuous lamination in a roll to roll manner using a heating roll, and the vacuum lamination method involving one-by-one sheet lamination under a reduced pressure. The adhesive layer in the multilayer film and the synthetic fiber fabric (base fabric) are laminated together in the heating temperature range from 120° C. to 160° C., for example.

The air bag can be used as an air bag for a vehicle, such as a front air bag, a side air bag, a side curtain air bag, and an outside air bag. Among these, a side curtain air bag needs to protect the occupant from the impact of a side collision, and to function to prevent the occupant from being expelled from the side window or louver when the vehicle rolls over. For the purposes, a side curtain air bag needs to instantaneously cover the entire side window and louver, in addition to keeping the inflated state for long time as compared with a front air bag. Accordingly, a desirable side curtain air bag has a higher adhesion strength between a barrier material and a base fabric, not to mention having an excellent air-tightness. The multilayer film according to the present disclosure is therefore more suitably used for such a barrier material.

EXAMPLES

The present disclosure will now be described with reference to examples. This disclosure is not limited to the following examples.

(Raw Materials)

The raw materials used in Examples and Comparative Examples and their notations are listed below. The glass transition temperatures (sometimes denoted as Tg) and the melting points (sometimes denoted as Tm) of each raw material were determined using a rheometer and a DSC to be described later.

<Adhesive Layer>

(Resin A)

CoPA1: copolyamide 6/12 (Tg=47° C. and Tm=128° C.) under the trade name of "Ube Nylon 7128B" (manufactured by Ube Industries, Ltd.)

CoPA2: copolyamide 6/12 (Tg=18° C. and Tm=134° C.) under the trade name of "Grilon BM13SBG" (manufactured by Ems-Chemie)

CoPA3: multinary copolyamide (Tg=17° C. and Tm=104° C.) under the trade name of "Griltex 1299A" (manufactured by Ems-Chemie)

(Resin B)

m-PE: acid-modified polyethylene (Tg=−24° C. and Tm=121° C.) under the trade name of "Admer NF587" (manufactured by Mitsui Chemicals, Inc.)

L-TPAE: low-melting-point thermoplastic polyamide elastomer (Tg=−43° C. and Tm=133° C.) under the trade name of "UBESTA XPA 9040F1" (manufactured by Ube Industries, Ltd.)

(Additive)

Additives which were added to the adhesive layers are listed below. For adding each additive to the resin(s), a master batch containing 5 mass % of the additive was melt-kneaded and pelletized in advance by a twin-screw extruder "TEM-18SS" manufactured by Toshiba Machine Co., Ltd. under conditions of a temperature of 180° C. and a screw revolution of 100 rpm. The resultant pellets (master batch) and the resins were then dry blended. Thereafter, each multilayer film was formed by the inflation method using the method to be described later.

Anti-blocking agent (AB agent): trade name Silton JC-70 (manufactured by Mizusawa Industrial Chemicals, Ltd.), ingredient: sodium calcium aluminosilicate, shape: spherical, and average particle size: 7 μm Nucleating agent (NA agent): trade name: MICRO ACE P-8 (manufactured by Nippon Talc Co., Ltd.), ingredient: talc, shape: scaly, and average particle size: 3.3 μm <Glue Layer> m-PE: acid-modified polyethylene (Tg=−24° C. and Tm=121° C.) under the trade name of "Admer NF587" (manufactured by Mitsui Chemicals, Inc.)

<Middle Layer>

LLDPE: metallocene-based polyethylene (Tg<−70° C. and Tm=122° C.) under the trade name of "Umerit 3570FC" (manufactured by UBE-MARUZEN Polyethylene Co., Ltd.)

OBC: polyolefin block copolymer (Tg=−51° C. and Tm=120° C.) under the trade name of "INFUSE 9500" (manufactured by Dow Chemical)

m-PE: acid-modified polyethylene (Tg=−24° C. and Tm=121° C.) under the trade name of "Admer NF587" (manufactured by Mitsui Chemicals, Inc.)

<Outer Layer>

H-TPAE: high-melting-point thermoplastic polyamide elastomer (Tg=24° C. and Tm=172° C.) under the trade name of "UBESTA XPA 9063F1" (manufactured by Ube Industries, Ltd.)

Hereinafter, method of measuring respective physical properties will be described.

(Melting Point)

A sheet with a thickness of 150 μm was produced using a press molding machine "P2-30T-400" manufactured by Toyo Seiki Seisaku-sho, Ltd. The melting peak was measured using a DSC ("Diamond DSC" manufactured by PerkinElmer Inc.) at a heating rate of 10° C./min, and was determined as the melting point. Each sample was produced through press molding under the conditions to be described below.

(Glass Transition Temperature)

A sheet with a thickness of 0.9 mm was produced using the press molding machine "P2-30T-400" manufactured by Toyo Seiki Seisaku-sho, Ltd. A loss tangent tan δ was measured by a rheometer ("MCR301" manufactured by Anton Paar GmbH), and the peak temperature at the loss tangent tan δ was determined as the glass transition temperature.

Measurement mode: torsion (measurement attachment: SRF10)

Sample: thickness=0.9 mm, width=10 mm, and measurement span=38 mm

Normal force: −0.3 N

Arc angle: 0.1%

Frequency: 1 Hz

Heating rate: 2° C./min (Blocking Resistance)

Figure 2:
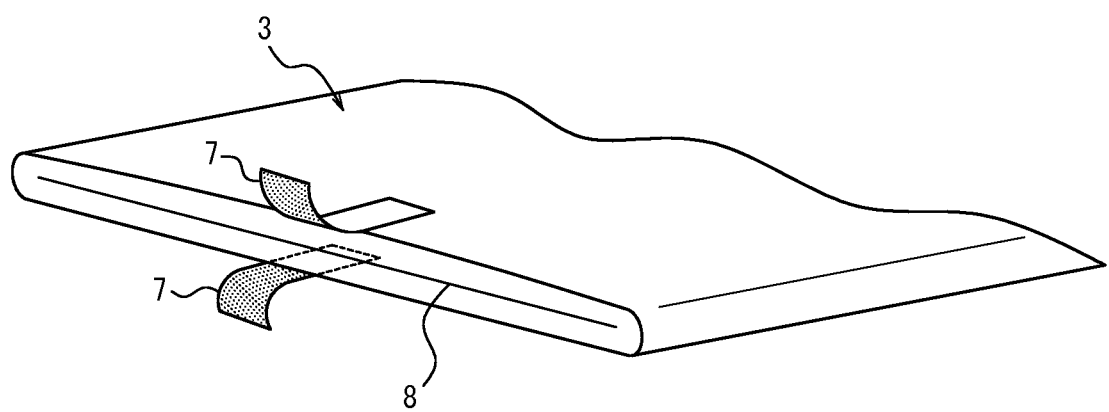
FIG. 2 illustrates a schematic representation of a method for evaluating the blocking resistance of two films overlapping one another, produced by the inflation method.

Multilayer films were produced under the conditions to be described later by the inflation method (FIG. 1), and were wound with two sheets overlapping one another. The peelability was evaluated immediately after the winding (within 10 minutes after the films were wound). In the evaluation, a cellophane tape (trade name: "CELLOTAPE" manufactured by NICHIBAN Co., Ltd.) is attached to each of the two surfaces at an end of the overlapped multilayer films (FIG. 2). The two cellophane tapes were simultaneously pulled to the directions perpendicular to the surface of the multilayer films. The resistance (sensory evaluation) and the number of attempts until the films were peeled off from each other were recorded. In this test, in case where the overlapped multilayer films were not peeled off but a tape was detached, new cellophane tapes were attached to the same locations and a peel test was repeated in the same manner. The peel test was carried out at three different locations for each sample, and the numbers of attempts until the films were peeled off at the three locations was averaged. An evaluation was made according to the following criteria. Note that "multilayer films being peeled off" refers to a state in which the films were separated from each other at a distance of 1 cm or greater at the boundary between the adhesive layers.

—Criteria—

A (very excellent): the films were peeled from each other in a single peel attempt with little resistance.

B (excellent): the films were peeled from each other in a single peel attempt with resistance.

C (good): the films were peeled from each other in two to five peel attempts.

D (bad): the films were peeled from each other in 6-20 peel attempts.

E (very bad): the films were not peeled off even after 20 peel attempts.

(Adhesion Strength)

Figure 3:
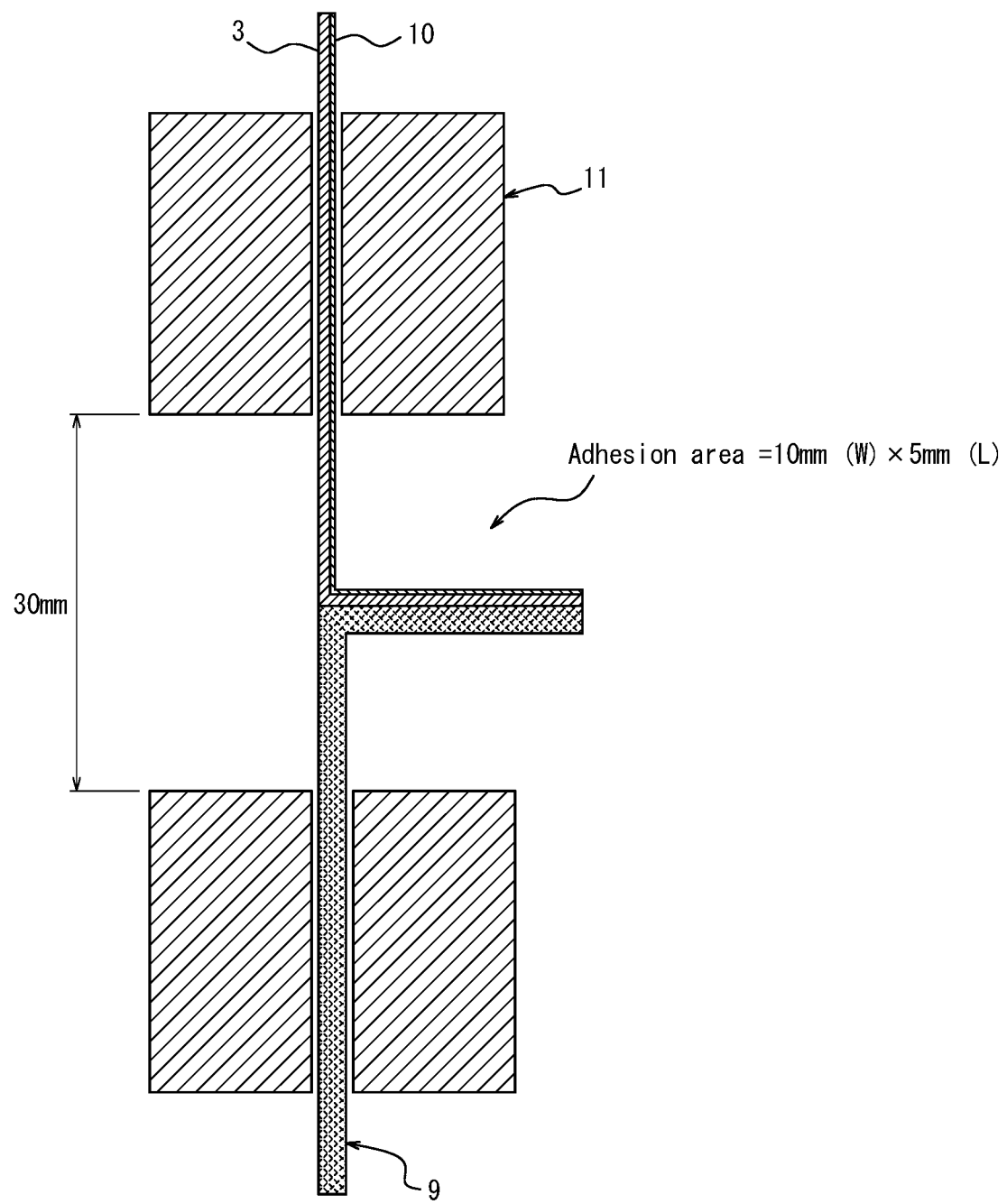
FIG. 3 illustrates a schematic representation of a 180°-peel test on a sample wherein a base fabric was heat sealed to a multilayer film.

A sample was heat-sealed under the following conditions. For preventing a multilayer film from being elongated thereby causing a reduction in the peeling speed in a peel test, cellophane tapes (trade name: "CELLOTAPE" manufactured by NICHIBAN Co., Ltd.) were attached to the entire surface of the outer layer of the multilayer film. Five 180°-peel tests were carried out using a tensile testing machine ("Autograph AG-IS" manufactured by Shimadzu Corporation) (FIG. 3). For each sample, the average of the maximum values was determined as the adhesion strength. The conditions for each 180°-peel test were as follows:

Sample conditioning: each sample was stored at 23° C. and 50% RH for 2 days

Peel test: 23° C. and 50% RH

Chuck separation: 30 mm (each sample was mounted so that the adhesion boundary was positioned at the center between the chucks)

Peel speed: 5 mm/min

<Heat Seal>

A multilayer film produced in each of Examples and Comparative Examples was cut out to a size of 10 mm in width×70 mm in length. The adhesive layer of the multilayer film and a base fabric made of polyamide 66 were overlapped, and were bonded using a heat sealer "TB-70-B" manufactured by TESTER SANGYO CO. LTD. under the following conditions:

Seal bar size: 5 mm in width×300 mm in length
Adhesion mode: Heat seal
Sealing pressure: 0.4 MPa by a pressure gauge (cylinder inner diameter=50 mm)
Sealing time: 2 seconds
Adhesion temperature settings: 130° C., 140° C., and 150° C. (the setting for the top and bottom seal bars)
(Flexibility)

A sample (laminate of the base fabric made of polyamide 66 described above and a multilayer film produced in each of Examples and Comparative Examples) was prepared by thermally laminating them using the laminator to be described later. The resistance (maximum resistance) of the sample when a loop was collapsed was determined by a loop stiffness tester (DA type manufactured by TOYO SEIKIKO-GYO CO., LTD.). The measurement conditions for the test were as follows. The sample was looped so that the multilayer film faced outside. Measurements were carried out on three different samples, and the average was determined (and was converted to a corresponding value for a width of 1 cm).

Sample conditioning: each sample was stored at 23° C. and 50% RH for 2 days
Sample width (in the weft direction of the base fabric): 20 mm
Chuck separation (in the warp direction of the base fabric): 50 mm
Test (compression) speed: 3.3 mm/min <Laminate>

Figure 4:
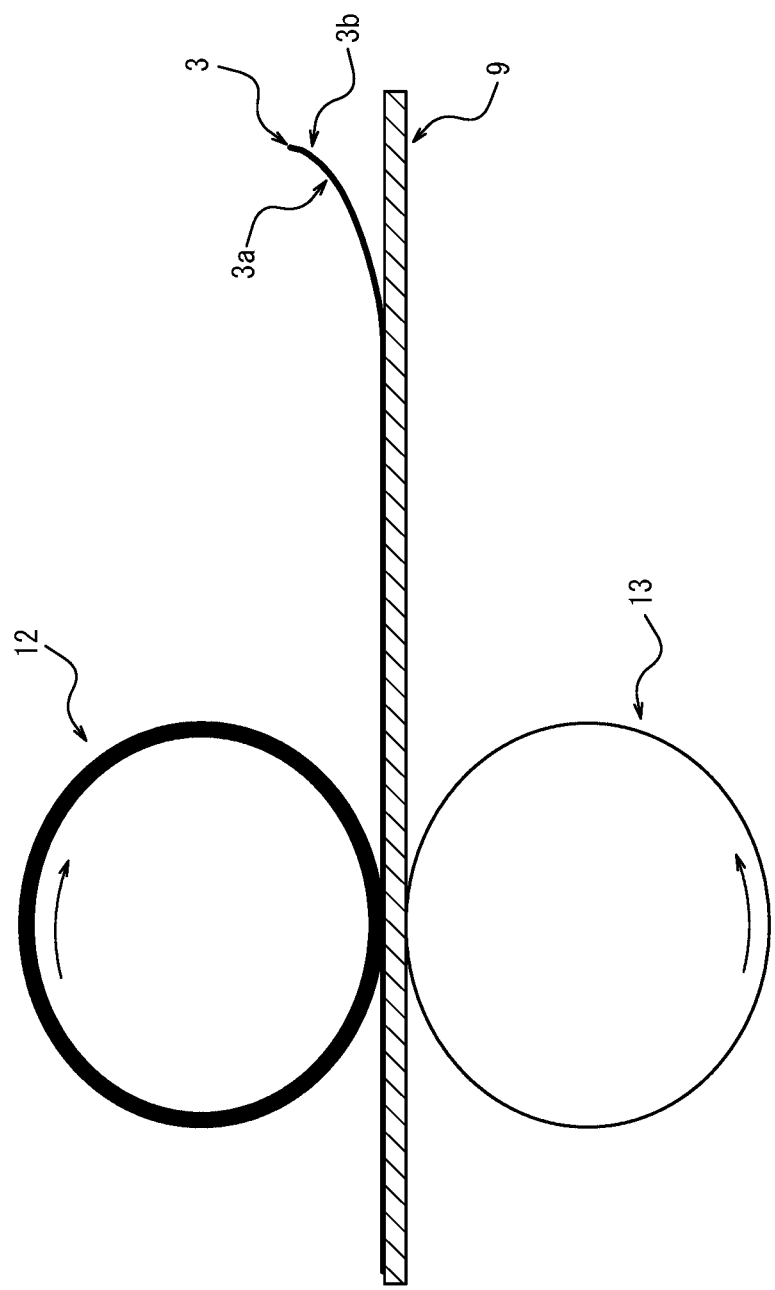
FIG. 4 illustrates a schematic representation of a laminator.

The multilayer film produced in each of Examples and Comparative Examples and a base fabric made of polyamide 66 (fiber fineness=235 tex; single yarn count=72; and fiber density: warp count=76/inch and weft count=74/inch) described above were overlapped and bonded using a laminator (FIG. 4) so that the multilayer film contacted the silicone rubber roll side. The lamination conditions during the lamination were as follows:

Temperature: 160° C.
Roll speed: 0.3 m/min
Linear load: 2.3 kg/cm (Method for Producing Multilayer Film)

Multilayer films were produced by the inflation method (FIG. 1) using a multilayer circular die, and multilayer films were wound around a 3-inch paper tube with the two multilayer films overlapping one another. In the production, the film was produced so that the adhesive layer was on the inner surface side 3b of the tubular film and the outer layer was on the outer surface side 3a. The conditions for producing the film were as follows.

Die temperature setting: 210° C.
Circular die: lip outer size=95 mm and lip clearance=3 mm
Blow-up ratio: 1.1 times
Air ring temperature: 22° C.
Film surface temperature immediately before the pinch rolls: 32° C.
Distance between the circular die and the pinch rolls: 2.4 m
Take-up speed: 12 m/min (Methods for Composition Analysis and Measurement of Thermal Characteristics of Multilayer Film)

For a multilayer film having an adhesive layer and an outer layer, example methods of determining the composition of components contained in the adhesive layer include the infrared analysis method and the NMR method.

In the case of a multilayer film with two layers in two types having an adhesive layer and an outer layer, the melting point and the crystallization temperature can be determined by directly sampling the multilayer film in a desired size and carrying out measurements according to the above-mentioned method of measuring the melting point. In the case of a multilayer films with three or more layers in three or more type having an adhesive layer, an outer layer, and a middle layer interposed therebetween, the multilayer film can be immersed in a solvent (such as hexafluoro-2-propanol) capable of dissolving only the adhesive layer, removing the solvent using an evaporator to separate the solid content from the solvent, and analyzing the solid content according to the above-mentioned method of measuring the melting point.

Example 1

A multilayer film with two layers in two types having the structure of "adhesive layer/outer layer" was produced. CoPA1 for the outer adhesive layer and H-TPAE for the outer layer were extruded from the multilayer circular die and inflated by the inflation method to produce the multilayer film with two layers in two types having a thickness of 45 μm. The layer structure and evaluation results of this multilayer film are summarized in Table 1. CoPA1 (glass transition temperature Tg=47° C. and Tm=128° C.) exhibited good blocking resistance and adhesiveness (in terms of the adhesion temperature range and the strength).

Example 2

A multilayer film with three layers in three types having the structure of "adhesive layer/middle layer/outer layer" was produced. The resins were extruded from the multilayer circular die and inflated by the inflation method to produce the multilayer film with three layers in three types having a thickness of 45 μm in the same manner as in Example 1 by using the same resins for the adhesive layer and the outer layer, except that 50 mass % of LLDPE and 50 mass % of m-PE were dry blended and used for the middle layer as the raw materials. The layer structure and evaluation results of this multilayer film are summarized in Table 1. Although the adhesive layer in Example 2 was thinner than the adhesive layer in Example 1, the blocking resistance and the adhesiveness (in terms of the adhesion temperature range and the strength) were good.

Example 3

A multilayer film with five layers in four types having the structure of "adhesive layer/glue layer/middle layer/glue layer/outer layer" was produced. CoPA1, m-PE, and LLDPE were used alone for the adhesive layer, the glue layers, and the middle layer, respectively. The same raw material as in Example 1 was used for the outer layer. A multilayer film having a thickness of 45 μm was produced. The layer structure, the mass ratio of the additive (the mass of the entire adhesive layer was taken as 100%), and evaluation results of the multilayer film are summarized in Table 1. The produced multilayer film was good in film forming ability and appearance, and the adhesive layer also exhibited a good blocking resistance.

Example 4

A multilayer film having a thickness of 45 μm was produced in the same manner as in Example 3, except that raw materials of 80 mass % of CoPA1 and 20 mass % of a master batch (base resin: CoPA1) containing the anti-blocking agent "Silton JC-70" were measured out, dry blended, and used for the adhesive layer. The layer structure and evaluation results of this multilayer film are summarized in Table 1. The anti-blocking agent added to the adhesive layer further improved the blocking resistance without negatively affecting the adhesiveness.

Example 5

A multilayer film having a thickness of 45 μm was produced in the same manner as in Example 3, except that raw materials of 90 mass % of CoPA1 and 10 mass % of a master batch (base resin: CoPA1) containing the nucleating agent "MICRO ACE P-8" were measured out, dry blended, and used for the adhesive layer. The layer structure and evaluation results of this multilayer film are summarized in Table 1. The nucleating agent added to the adhesive layer further improved the blocking resistance without negatively affecting the adhesiveness.

Example 6

A multilayer film having a thickness of 45 μm was produced in the same manner as in Example 3, except that raw materials of 60 mass % of CoPA1, 10 mass % of the master batch (base resin: CoPA1) containing the nucleating agent "MICRO ACE P-8", and 30 mass % of the master batch (base resin: CoPA1) containing the anti-blocking agent "Silton JC-70" were measured out, dry blended, and used for the adhesive layer. The layer structure and evaluation results of this multilayer film are summarized in Table 1. The anti-blocking agent and the nucleating agent added to the adhesive layer even further improved the blocking resistance.

Example 7

A multilayer film having a thickness of 45 μm was produced in the same manner as in Example 6, except that raw materials of 20.8 mass % of CoPA1, 39.2 mass % of CoPA2, 10 mass % of the master batch (base resin: CoPA1) containing the nucleating agent "MICRO ACE P-8", and 30 mass % of the master batch (base resin: CoPA1) containing the anti-blocking agent "Silton JC-70" were measured out, dry blended, and used for the adhesive layer. The layer structure and evaluation results of this multilayer film are summarized in Table 1. Even when CoPA2 (multinary copolyamide of Tg=18° C.) was blended into the adhesive layer, the blocking resistance and the adhesiveness remained good.

Example 8

A multilayer film having a thickness of 45 μm was produced in the same manner as in Example 6, except that raw materials of 50 mass % of LLDPE and 50 mass % of OBC were dry blended and used for the middle layer. The layer structure and evaluation results of this multilayer film are summarized in Table 1. Example 8 in which OBC (polyolefin block polymer having Tg=−51° C.) was blended with LLDPE for the middle layer exhibited a better flexibility than the middle layer of the multilayer film in which the middle layer only contained LLDPE (Example 6).

Example 9

A multilayer film having a thickness of 45 μm was produced in the same manner as in Example 8, except that raw materials of 11 mass % of CoPA1, 49 mass % of m-PE, 10 mass % of the master batch (base resin: CoPA1) containing the nucleating agent "MICRO ACE P-8", and 30 mass % of the master batch (base resin: CoPA1) containing the anti-blocking agent "Silton JC-70" were measured out, dry blended, and used for the adhesive layer. The layer structure and evaluation results of this multilayer film are summarized in Table 1. Even when the modified polyethylene (m-PE) was blended with the copolyamide (CoPA1) for the adhesive layer, the film forming ability and the appearance of the film were still good, and the adhesiveness and the flexibility were also good.

Example 10

A multilayer film having a thickness of 45 μm was produced in the same manner as in Example 8, except that raw materials of 40.4 mass % of CoPA1, 19.6 mass % of L-TPAE, 10 mass % of the master batch (base resin: CoPA1) containing the nucleating agent "MICRO ACE P-8", and 30 mass % of the master batch (base resin: CoPA1) containing the anti-blocking agent "Silton JC-70" were measured out, dry blended, and used for the adhesive layer. The layer structure and evaluation results of this multilayer film are summarized in Table 1. Even when the low-melting-point thermoplastic polyamide elastomer (L-TPAE) was blended with the copolyamide (CoPA1) for the adhesive layer, the film forming ability and the appearance of the film were still good, and the adhesiveness and the flexibility were also good.

Example 11

A multilayer film having a thickness of 45 μm was produced in the same manner as in Example 8, except that raw materials of 1.2 mass % of CoPA1, 19.6 mass % of m-PE, 39.2 mass % of L-TPAE, 10 mass % of the master batch (base resin: CoPA1) containing the nucleating agent "MICRO ACE P-8", and 30 mass % of the master batch (base resin: CoPA1) containing the anti-blocking agent "Silton JC-70" were measured out, dry blended, and used for the adhesive layer. The layer structure and evaluation results of this multilayer film are summarized in Table 1. Even when the acid-modified polyethylene (m-PE) and the low-melting-point thermoplastic polyamide elastomer were blended with the copolyamide (CoPA1) for the adhesive layer, the film forming ability and the appearance of the film were still good, and the adhesiveness and the flexibility were also good.

Example 12

A multilayer film having a thickness of 45 μm was produced in the same manner as in Example 8, except that raw materials of 30.6 mass % of CoPA1, 29.4 mass % of CoPA3, 10 mass % of the master batch (base resin: CoPA1) containing the nucleating agent "MICRO ACE P-8", and 30 mass % of the master batch (base resin: CoPA1) containing the anti-blocking agent "Silton JC-70" were measured out, dry blended, and used for the adhesive layer. The layer structure and evaluation results of this multilayer film are summarized in Table 1. Even when the multinary copolyamide (CoPA3) was blended with the copolyamide (CoPA1) for the adhesive layer, the film forming ability and the appearance of the film were still good, and the adhesiveness and the flexibility were also good.

Comparative Example 1

A multilayer film was produced in the same manner as in Example 3, except that L-TPAE was used in place of CoPA1 for the adhesive layer. The layer structure and the evaluation results of this multilayer film were summarized in Table 1. The blocking was strong in the film formation step and the film could not be peeled off. The adhesion strength thus could not be measured. The glass transition temperature, the melting point, and the crystallization temperature of L-TPAE (press sheet) used for the adhesive layer in this step were −43° C., 133° C., and 99° C., respectively.

Comparative Example 2

A multilayer film was produced in the same manner as in Example 5, except that 60 mass % of L-TPAE, 10 mass % of a master batch (base resin: L-TPAE) containing the nucleating agent "MICRO ACE P-8", and 30 mass % of a master batch (base resin: L-TPAE) containing the anti-blocking agent "Silton JC-70" were measured out, dry blended, and used as resins for the adhesive layer. The layer structure and evaluation results of this multilayer film are summarized in Table 1. The blocking resistance and the adhesiveness were inferior.

TABLE 1

| | | Unit | Example 1 | Example 2 | Example 3 | Example 4 | Example 5 | Example 6 | Example 7 |
|---|---|---|---|---|---|---|---|---|---|
| Composition of multilayer film | Outer layer | ( ): mass % | H-TPAE (100) | H-TPAE (100) | | | H-TPAE (100) | | |
| | Glue layer | | — | — | | | m-PE (100) | | |
| | Middle layer | | — | LLDPE (50) m-PE (50) | | | LLDPE (100) | | |
| | Glue layer | | — | — | | | m-PE (100) | | |
| | Adhesive layer | | CoPA1 (100) | CoPA1 (100) | CoPA1 (100) | CoPA1 (99) AB agent (1) | CoPA1 (99.5) NA agent (0.5) | CoPA1 (98) AB agent (1.5) NA agent (0.5) | CoPA1 (58.8) CoPA2 (39.2) AB agent (1.5) NA agent (0.5) |
| Thickness ratio of layers in multilayer film | Outer layer | % | 50 | 20 | | | 20 | | |
| | Glue layer | | — | — | | | 10 | | |
| | Middle layer | | — | 70 | | | 50 | | |
| | Glue layer | | — | — | | | 10 | | |
| | Adhesive layer | | 50 | 10 | | | 10 | | |
| Thickness of multilayer film | | μm | 45 | 45 | | | 45 | | |
| Blocking resistance | | — | C | C | C | B | B | A | B |
| Adhesion Strength | Adhesion temp: 130° C. | N/cm | 6.4 | 6 | 6.1 | 6.3 | 6.4 | 5.8 | 4.8 |
| | Adhesion temp: 140° C. | | 7.4 | 7.6 | 7.2 | 7.4 | 7.2 | 6.3 | 6.6 |
| | Adhesion temp: 150° C. | | 7.1 | 7.2 | 7.3 | 7.5 | 7.5 | 6.4 | 7 |
| Flexibility (loops tiffness) | | mN/cm | not evaluated | not evaluated | not evaluated | not evaluated | not evaluated | 285 | not evaluated |

| | | Unit | Example 8 | Example 9 | Example 10 | Example 11 | Example 12 | Comp Example 1 | Comp Example 2 |
|---|---|---|---|---|---|---|---|---|---|
| Composition of multilayer film | Outer layer | ( ): mass % | | | H-TPAE (100) | | | H-TPAE (100) | |
| | Glue layer | | | | m-PE (100) | | | m-PE (100) | |
| | Middle layer | | | | LLDPE(50) OBC (50) | | | LLDPE (100) | |
| | Glue layer | | | | m-PE (100) | | | m-PE (100) | |
| | Adhesive layer | | CoPA1 (98) AB agent (1.5) NA agent (0.5) | CoPA1 (49) m-PE (49) AB agent (1.5) NA agent (0.5) | CoPA1 (78.4) L-TPAE (19.6) AB agent (1.5) NA agent (0.5) | CoPA1 (39.2) m-PE (19.6) L-TPAE (39.2) AB agent (1.5) NA agent (0.5) | CoPA1 (68.6) CoPA3 (29.4) AB agent (1.5) NA agent (0.5) | L-TPAE (100) | L-TPAE (98) AB agent (1.5) NA agent (0.5) |
| Thickness ratio of layers in multilayer film | Outer layer | % | | | 20 | | | 20 | |
| | Glue layer | | | | 10 | | | 10 | |
| | Middle layer | | | | 50 | | | 50 | |
| | Glue layer | | | | 10 | | | 10 | |
| | Adhesive layer | | | | 10 | | | 10 | |
| Thickness of multilayer film | | μm | | | 45 | | | 45 | 45 |
| Blocking resistance | | — | A | A | A | A | B | E | D |
| Adhesion Strength | Adhesion temp: 130° C. | N/cm | 6.2 | 5.4 | 4.9 | 4.6 | 6.3 | could not be peeled off and not evaluated | 3.6 |
| | Adhesion temp: 140° C. | | 7.5 | 6.6 | 5.1 | 5.5 | 8.1 | | 5.7 |
| | Adhesion temp: 150° C. | | 7.2 | 6.8 | 5.2 | 5.3 | 8 | | 4.8 |
| Flexibility (loops tiffness) | | mN/cm | 232 | 225 | 230 | 223 | 228 | | not evaluated |

As evident from the results in Table 1, the blocking resistance was improved by using the adhesive layer containing the resins having glass transition temperatures within the certain range. In addition, the blocking resistance further improved by adding the nucleating agent and/or the anti-blocking agent. Further, the process window of an adhesion was extended by using the adhesive layer containing the resins having glass transition temperatures within the certain range. Further, excellent characteristics including the improved adhesion strength were also achieved by using the copolyamide as the resin included in the adhesive layer.

INDUSTRIAL APPLICABILITY

The multilayer film according to the present disclosure can be stably produced because of reduced occurrence of blocking during a film formation, and its excellent adhesiveness to synthetic fiber fabrics enables the multilayer film to be suitably used for air bag applications.

REFERENCE SIGNS LIST

1 Multilayer circular die
2 Air ring
3 Multilayer film
3a Outer surface (outer layer) side
3b Inner surface (adhesive layer) side
4 Deflator
5 Pinch roll
6 Guide roll
7 CELLOTAPE tape
8 Overlapping boundary between adhesive layers
9 Base fabric made of polyamide 66
10 Kapton adhesive tape
11 Chuck
12 Pressing roll (provided with silicone rubber lining)
13 Heating roll (chrome plated)

The invention claimed is:

1. A multilayer film for use in an air bag, the multilayer film comprising:
   an adhesive layer;
   an outer layer, and
   a middle layer between the adhesive layer and the outer layer,
   wherein the middle layer comprises a polyolefin-based resin,
   the adhesive layer comprises a resin having a glass transition temperature from 20° C. to 80° C. and a melting point from 100° C. to 160° C.,
   the resin in the adhesive layer is one of a single component resin and a mixture of a plurality of components blended together, and
   the outer layer comprises a resin having a melting point higher than the melting point of the resin comprised in the adhesive layer by 20° C. or higher.

2. The multilayer film for use in an air bag according to claim 1, wherein the resin comprised in the adhesive layer is a polyamide-based resin.

3. The multilayer film for use in an air bag according to claim 2, wherein the polyamide-based resin is a copolyamide.

4. The multilayer film for use in an air bag according to claim 3, wherein the copolyamide is a copolymer of polyamide 12 and polyamide 6.

5. The multilayer film for use in an air bag according to claim 3, wherein the adhesive layer comprises the copolyamide in an amount of 10 mass % or more relative to 100 mass % of the adhesive layer.

6. The multilayer film for use in an air bag according to claim 1, wherein the adhesive layer further comprises an anti-blocking agent and/or a nucleating agent.

7. An air bag comprising:
   a synthetic fiber fabric; and
   the multilayer film for use in an air bag according to claim 1, the adhesive layer in the multilayer film being laminated with the synthetic fiber fabric.

8. The air bag according to claim 7, wherein the synthetic fiber fabric comprises polyamide fibers or polyester fibers.

9. The multilayer film for use in an air bag according to claim 1, the middle layer comprising an acid-modified polyolefin-based resin.

10. The multilayer film for use in an air bag according to claim 1, the adhesive layer comprising an acid-modified polyolefin-based resin.

* * * * *